United States Patent

Rosso

[15] 3,691,408

[45] Sept. 12, 1972

[54] METHOD AND MEANS FOR THERMOELECTRIC GENERATION OF ELECTRICAL ENERGY

[72] Inventor: John B. Rosso, Tulsa, Okla.

[73] Assignee: Combustion Engineering, Inc., New York, N.Y.

[22] Filed: Jan. 27, 1970

[21] Appl. No.: 6,160

[52] U.S. Cl. ............................310/4, 62/5, 136/209, 136/211

[51] Int. Cl. ..............................................H02n 3/00

[58] Field of Search .......310/4; 322/2; 136/209, 210, 136/211, 212; 62/3, 5

[56] References Cited

UNITED STATES PATENTS 3,197,342 7/1965 Neild, Jr. ...................136/210

3,214,923 11/1965 Palmisano et al................62/5

*Primary Examiner*—Laramie E. Askin
*Assistant Examiner*—H. Huberfeld
*Attorney*—Arthur L. Wade

[57] ABSTRACT

A system is disclosed in which gas produced from a hydrocarbon reservoir is directed through a vortex tube to separate hot and cold fractions therefrom. The fractions are passed across heat exchange elements in contact with a thermopile to produce an electric current.

9 Claims, 3 Drawing Figures

INVENTOR.
JOHN B. ROSSO

BY Arthur L. Wade

ATTORNEY

INVENTOR.
JOHN B. ROSSO

BY Arthur L Wade

ATTORNEY

METHOD AND MEANS FOR THERMOELECTRIC GENERATION OF ELECTRICAL ENERGY

BACKGROUND OF THE INVENTION

1. Field of the Invention.

This invention relates to the generation of electrical energy by a thermoelectric generator employing the Seebeck effect, the temperature differential necessary to the function of the generator being derived from fluids passed through a vortex tube. More particularly, the invention relates to rotating a gas under pressure within a vortex tube in a particular velocity range to separate the hot and cold fractions or components thereof, and utilizing these separated components to maintain an adequate temperature differential across the junctions of the elements of a thermopile to generate electrical current.

2. Description of the Prior Art.

It is known to generate electricity by maintaining a temperature differential across the junction of two materials having dissimilar thermoelectric properties. This phenomenon is referred to as the Seebeck effect. The current produced is very nearly proportional to the temperature differential across the junctions.

It is also known to render a gas into its separate components or fractions of high and low temperatures (relative to one another, or to the median temperature of the gas) by devices such as a Hilsch tube or Ranque-Hilsch tube. Such devices are often referred to generically as vortex tubes, and are characterized by structures in which gases are directed into circular flow paths at high velocities within a confined volume of cylindrical or conical shape. The centrifugal forces applied to a gas act to separate the hotter from the colder components of the gas, the hotter components tending to be localized in one certain part of the rotating fluid column, and the colder components of the gas tending to be localized in another.

One of the several problems associated with the thermoelectric generation of electrical energy, where the source of the temperature differential for the thermopile is desired or required to be integral to the generator, is in the large size and weight of the unit. For example, where combustion is used to produce the hot gases to maintain the necessary differential, the size, weight, and myriad operating and safety problems of furnaces or heaters arise. Similarly, where the heat of a nuclear pile is utilized, the man y problems of shielding, safety, fuel costs, efficiency of the heat exchange, and the like arise. The size, complexity, maintenance and cost of devices such as these often preclude the use of thermoelectric generation systems.

SUMMARY OF THE INVENTION

The principal object of the invention is to provide an improved system for the thermoelectric generation of electrical energy, the system being of relatively light weight and compact size, substantially maintenance-free, and economical.

Another object of the invention is to utilize a gaseous fluid under pressure in a vortex tube so that the gas is segregated into relatively hot and cold fractions which are controlled to act as heat exchange media to maintain a temperature differential to drive a thermoelectric generator.

Another object of the invention is to utilize a portion of the thermal and pressure energy of a gas produced from a hydrocarbon reservoir, the gas so produced being directed through the vortex tube and subsequently used as the heat exchange medium in the thermopile element of the thermoelectric generating system.

Another object of the invention is to provide an economical and substantially maintenance-free voltage generating system for uses related to the operation and control of field processing equipment for the production from a hydrocarbon reservoir, whether such equipment is located on land or below the surface of the water.

The invention contemplates a system for the generation of electrical energy. A gas under pressure is directed into a vortex tube tangentially to a wall thereof so that the gas is rotated at a high velocity within the tube. The centrifugal forces acting upon the gas separate the relatively hot and cold fractions of the gas. These fractions exit from the tube and are passed across the thermopile of a thermoelectric generator to maintain the temperature differential necessary for the generation of electric current.

Other objects, advantages and features of this invention will become apparent to one skilled in the art upon consideration of the written specification, appended claims, and attached drawings, wherein;

DESCRIPTION OF THE PREFERRED EMBODIMENT

1. The Operating Conditions.

Among the various means of providing electricity is a system utilizing the thermoelectric generator. As discussed above, certain considerations often limit the utility of such a system, such as thermal input requirements, complexity, size and weight, maintenance requirements, efficiency of the heat exchange, and so on.

2. The Structure in General

It is highly desirable from construction, safety, maintenance, cost, and related standpoints to provide a thermoelectric generating system which avoids the use of fired equipment or the use of radioactive material to meet thermal input requirements; which is without moving parts, and thus of significant simplicity; which may employ an efficient exchange medium such as large volumes of gaseous fluid moving across the thermopile at high velocity; which is productive of a substantially constant electrical output; and which is safe, rugged, inexpensive to construct and maintain, and able to operate unattended for protracted periods of time in any natural environment, including subsea.

3. The Structure and Function of the Preferred Embodiment.

Figure 1:
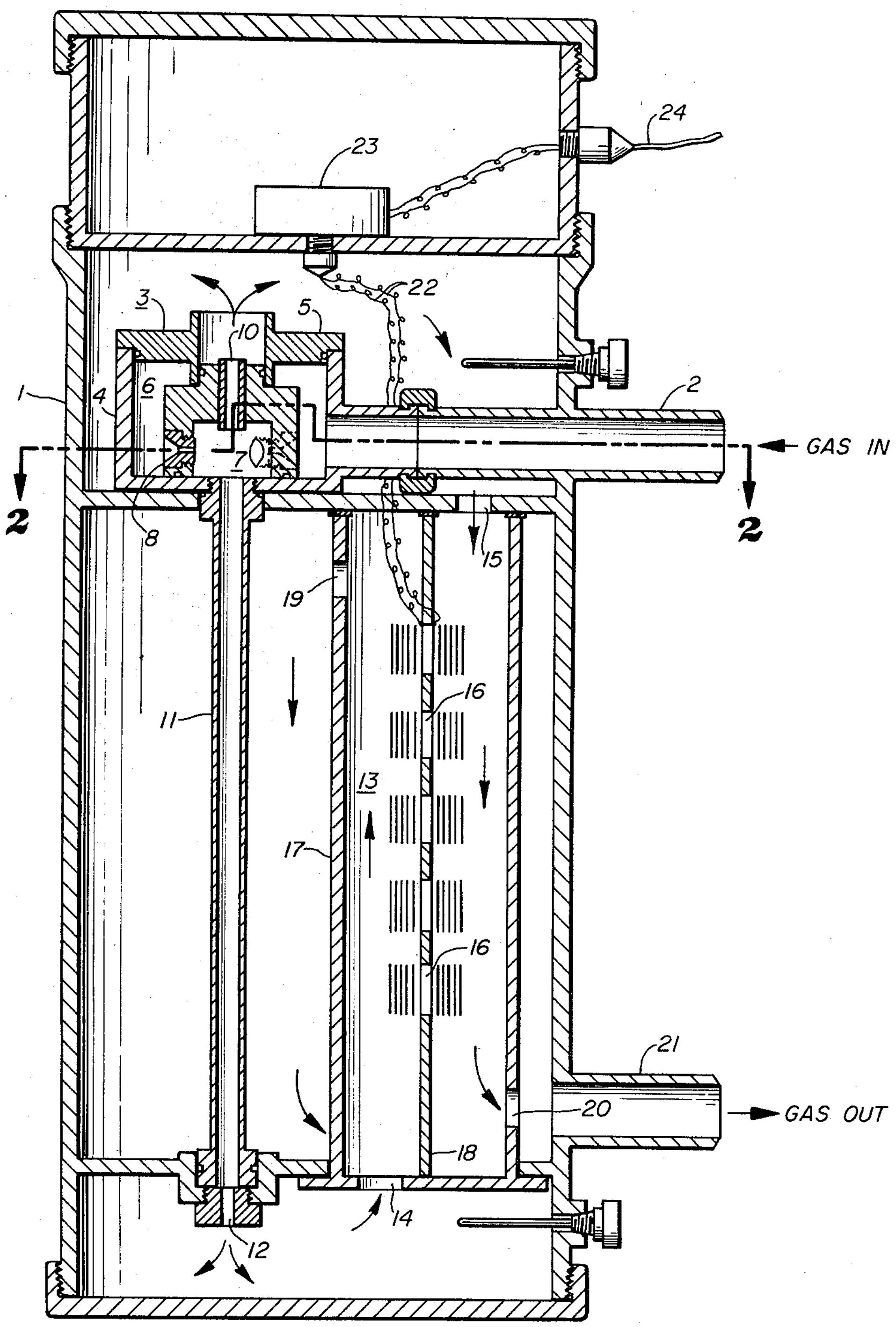
FIG. 1 is a cross-sectional elevation of the system embodying the invention.

FIG. 1 discloses the concept of the invention in its preferred embodiment. A housing 1 sealed to the external environment contains the elements of the generating system. The gas under pressure to be used as the heat exchange medium enters through conduit 2 from an appropriate source not shown. The fluid is subsequently directed to a vortex tube for segregation of its components of relatively high and low temperature.

The vortex tube, generally identified by the numeral 3, consists of several elements. These include the containing walls 4,5 of the gas supply reservoir volume 6; volume 6 is analogous to the "surge tank" of a flow line or process vessel complex, and acts as a pulsation damper upon the gas supplied to the vortex chamber 7.

Also included as elements of vortex tube 3 are inlet orifices 8,9, the cold gas orifice 10, hot gas conduit 11 and hot gas orifice 12.

Figure 2:
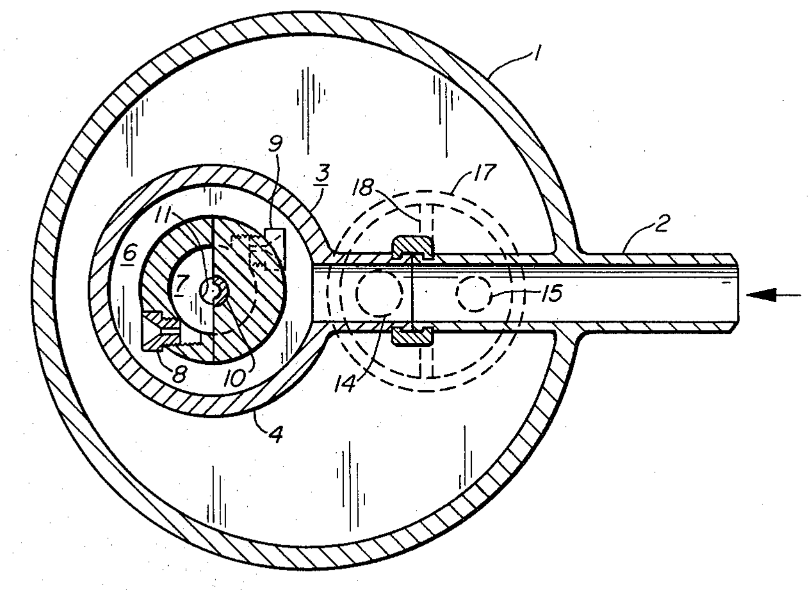
FIG. 2 is an end view elevation of the system of FIG. 1 viewed along section 2—2.

The gas under pressure in supply volume 6 is introduced into the vortex chamber 7 through the orifices 8,9. Referring to FIG. 2, it is seen that orifices 8,9 are mounted tangential to the wall of chamber 7. It is apparent that this arrangement of the orifices will impart a rotation to the gas as it enters the chamber. It is also apparent that the two inlets will reinforce each other in the rotation effect produced in the supply gas. It is noted, however, that only one inlet might be used in certain applications, and two or more in others.

Very high velocities in relation to particular inlet pressures are produced in the gas in chamber 7 by the structure disclosed. The Hilsch tube phenomenon is thereupon observed in the passage of relatively hot gas molecules from chamber 7 through conduit 11 and orifice 12, and of relatively cold gas molecules through orifice 10. These hot and cold fractions of the gas supply entering the generator system through conduit 2 are presumably segregated in high speed rotation by the differences in activity and/or unit volume mass between gas molecules of varying heat content.

As the hot gas exits orifice 12, it is directed by the internals of the housing structure into one side of the thermopile, denoted generally by numeral 13, through opening 14. Similarly, the cold gas exiting orifice 10 is directed into the cold side of thermopile 13 through opening 15. The five thermoelectric elements 16 disclosed in FIG. 1 are isolated and insulated from the other interior compartments of the generator system housing by a suitable containment structure 17, and their hot and cold sides are defined by dividing wall 18.

Heat exchange fins of suitable common design are attached to each of the thermoelectric elements to promote efficient heat exchange between the gas and the junctions of the elements 16. Countercurrent flow of the gases is also imposed to this end, as well as to insure that the temperature differential across all elements 16 is substantially equal.

The gas heat exchange medium exits from the respective sides of thermopile 13 by openings 19,20, and thence from the generator through conduit 21. The hot and cold gases are shown as recombining in conduit 21 in the preferred embodiment. Other uses of the hot and cold components of the gas could be made, however, since the temperature drop during the rapid traverse of the thermopile is minimal.

Thermoelectric elements 16 are disclosed connected in series. As is apparent, the voltages produced by each element are thus added. Lead wires 22 conduct the low voltage-high amperage electrical energy characteristic of a thermoelectric generator to a voltage converter and regulator device 23.

Figure 3:
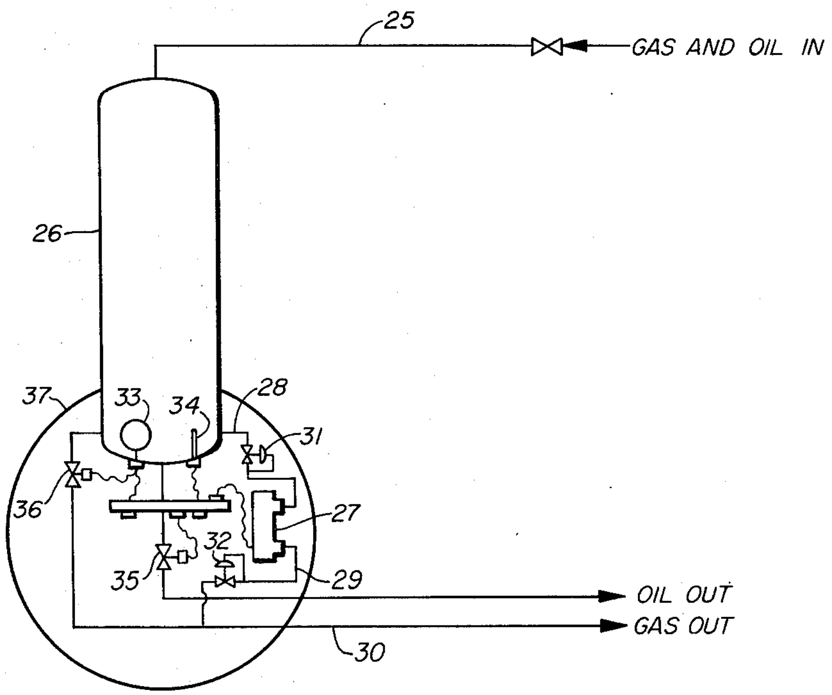
FIG. 3 is a diagrammatic illustration of a simplified oilfield production processing system in which the present invention is incorporated to supply a voltage for operation of various control equipment.

The energy is thence conducted by transmission lead 24 to consumption, for example, to maintain a charge upon storage batteries supplying power to an oilfield production facility such as that shown in FIG. 3. The utility of consuming the voltages produced by the generator system to maintain the potential of a battery system is apparent. Interruption of gas flow through the system will not result in an interruption of power in the control circuits, transients are avoided, and periodic flow of gas through the generator system may be instituted in preference to continuous flow.

It is also apparent that the pressure of the gas from the source may require regulation by pressure regulator valves, chokes, or similar means, the pressure of reservoir gas commonly being in excess of pressure necessary to operate the generator system. For example, it was found that inlet pressures in the range of 250 psi were desirable. Such pressures imparted sufficient velocity to the gas within the vortex chamber and in its traverse across the thermopile.

It is further clear that the novel system could be adapted to service in hazardous or hostile environments, or in environments that must be kept free of the gas itself, by the simple expedient of sealing the housing to isolate it from its environment.

It is also noted that the novel system of Applicant overcomes a practical limitation often heretofore of primary concern in the thermoelectric generation of electricity, namely the low efficiency of the conversion. It is generally accepted that only approximately nine percent of thermal energy is converted to electrical energy by thermoelectric generators. Thus, for thermoelectric generation systems to be economically feasible, a substantial and readily available quantity of heat exchange medium of high temperature differential is required. Stated differently, it is required that large amounts of the relatively hot and cold fluids be readily available to maintain a satisfactory temperature drop across the junctions of the thermoelectrically dissimilar materials of the thermopile. The thermal energy to achieve and maintain the required differential is supplied in a novel manner by the invention by efficient use of energy contained within a gas under pressure.

4. Actual Reduction to Practice.

The system disclosed is under test in Zakum Field, Abu Dhabi. The system of FIG. 1 is mounted on an oil and gas separator specially built for subsea operation. Various details shown reflect actual design features of the prototype.

FIG. 3 depicts in simplified detail the use in the actual reduction of the embodiment of the inventive concept. Oil and gas are transported from subsea wells through flow-line 25 to separator 26. Inlet gas for the thermoelectric generator system 27 is supplied from the separator by conduit 28. The gas exits the generator system 27 by conduit 29 and is recombined with the gas from the separator in line 30. Pressure regulator valves 31,32 control and regulate the internal pressure of generator system 27, and the flow rate of gas through the system.

Electrical energy generated by the invention is indicated in FIG. 3 in usage common to oilfield process operations, e.g., in level control 33, thermometer 34, and flow line valves 35,36. A housing structure 37 is illustrated for these units.

5. Summary.

The concept of the invention realized in the preferred embodiment provides a solution to certain problems in thermoelectric generation of electrical energy which had previously restricted this generation technique to limited application. The inventive concept overcomes these problems in a system which combines a flowing stream of gas under pressure with a vortex tube and a thermopile. The gas is supplied in the actual reduction from production from an oil and gas reservoir, an excellent source of large volumes of high pressure gas available for this service.

The invention permits thermoelectric generation of electrical energy in means economical to produce and maintain, and of design and operational simplicity. The embodiment has no moving parts, and is very compact and light in weight in comparison to a thermoelectric generator using combustion or nuclear energy to maintain the necessary temperature differential at the thermopile. The gas supply can be conveniently regulated as to pressure and/or flow rate at a point external to the generation system's housing, or, to some extent, within the housing by selection of orifice sizes.

The embodiment is furthermore not subject to the usual harsh considerations of conversion efficiency, since the gas heat exchange medium is, for practical purposes, limitless in quantity and of high pressure.

From the foregoing it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A system for generating electrical energy, including, a source of gas under a pressure sufficient to maintain a predetermined flow of gas through the system, a vortex tube connected to the source for segregating the relatively hot fraction from the relatively cold fraction of the gas, a thermopile arranged to receive the hot fraction from the vortex tube on a first side and the cold fraction on a second side, a first conduit means connected between the hot side of the vortex tube and the first side of the thermopile, a second conduit means connected between the cold side of the vortex tube and the second side of the thermopile, a first and second exit conduit means connected to the respective sides of the thermopile for discharge of the gas fractions from the generating system, and an electrical circuit connected to the thermopile for conducting the current produced by the generating system.

2. The system of claim 1, in which, the source of gas under pressure is a producing reservoir of hydrocarbons.

3. A system for generating a D.C. voltage from a portion of the thermal energy of a gas under pressure, the pressure being equal to or greater than the pressure required to maintain at least periodically a predetermined minimum flow of gas through the system, including, a housing for containment of the system, a conduit connected between the source of the gas and the housing and within which the gas under pressure is conducted, an orifice through which the gas in the conduit containing the gas under pressure must flow, a vortex chamber arranged to receive the gas flowing through the orifice, and within which the gas is rotated at high velocity to separate hot and cold components thereof, a first and second conduit means connected to the vortex chamber through which the hot and cold components, respectively, of the gas exit the vortex chamber, a thermopile situated in a compartment within the housing and arranged to receive the hot component from the first conduit means on a first side and the cold component from the second conduit means on a second side, said conduits arranged to direct the hot and cold components in countercurrent flow to one another as they traverse the thermopile, conduit means connected to the respective sides of the thermopile through which the components of the gas exit the compartment of the thermopile and are discharged from the housing of the system, an electrical circuit connected to the thermopile for conducting the current produced by the temperature differential maintained across the junctions of the thermopile.

4. The system of claim 3, including, a chamber connected to that conduit between the source of gas under pressure and the housing containing the system to act as a gas supply reservoir for the vortex chamber.

5. The system of claim 3, in which, a plurality of orifices are arranged tangentially to the wall of the vortex chamber to introduce the gas into the vortex chamber and impart a rotation thereto.

6. The system of claim 3, in which, the source of the gas under pressure is a producing reservoir of hydrocarbons.

7. A method for converting a portion of the thermal energy of a gaseous fluid under pressure to electrical energy, including, conducting the gas from its source to the conversion site, rotating the regulated gas within a closed space at the conversion site at high velocity to segregate relatively hot and cold fractions thereof, extracting the segregated fractions from the closed space along separate flow paths and introducing them to a thermopile, flowing the gas fractions across the thermopile to cause the thermopile to produce an electric current according to the Seebeck effect, removing the gas flowed across the thermopile from the conversion site, and conducting the electrical energy thus produced to means for performing work.

8. The method of claim 7, including, regulating the gas from the source to provide a predetermined pressure and predetermined flow rate at the conversion site.

9. The method of claim 7, including, sealing the conversion site, such that fluids within the site may not escape therefrom and fluids external to the site may not enter thereinto.

* * * * *